United States Patent
Kitahara (10) Patent No.: US 7,227,113 B2
(45) Date of Patent: Jun. 5, 2007

(54) CONFOCAL LASER SCANNING MICROSCOPE

(75) Inventor: Akihiro Kitahara, Hachioji (JP)

(73) Assignee: Olympus Corporation, Tokyo (JP)

( * ) Notice: Subject to any disclaimer, the term of this patent is extended or adjusted under 35 U.S.C. 154(b) by 190 days.

(21) Appl. No.: 10/992,421

(22) Filed: Nov. 18, 2004

(65) Prior Publication Data

US 2005/0161593 A1 Jul. 28, 2005

(30) Foreign Application Priority Data

Nov. 21, 2003 (JP) ............................. 2003-393008

(51) Int. Cl.
*G02B 21/00* (2006.01)
*H01J 3/14* (2006.01)

(52) U.S. Cl. ................ 250/201.3; 250/234; 356/237.2; 359/388

(58) Field of Classification Search ................ 250/234, 250/201.3, 216; 356/237.2, 237.3, 237.4; 359/368, 385, 388

See application file for complete search history.

(56) References Cited

U.S. PATENT DOCUMENTS 6,069,690 A * 5/2000 Xu et al. ...................... 356/73

FOREIGN PATENT DOCUMENTS

JP 9-133869 5/1997

* cited by examiner

*Primary Examiner*—Kevin Pyo
(74) *Attorney, Agent, or Firm*—Scully, Scott, Murphy & Presser, P.C.

(57) ABSTRACT

A confocal laser scanning microscope acquires confocal images of a sample. The microscope is provided with an optical-microscope optical system which acquires non-confocal images of the sample by detecting measurement light coming from the sample. The optical-microscope optical system includes optical systems corresponding to at least two observation methods, and one of the optical systems is selected during use.

11 Claims, 4 Drawing Sheets

CONFOCAL LASER SCANNING MICROSCOPE

CROSS-REFERENCE TO RELATED APPLICATIONS

This application is based upon and claims the benefit of priority from prior Japanese Patent Application No. 2003-393008, Nov. 21, 2003, the entire contents of which are incorporated herein by reference.

BACKGROUND OF THE INVENTION

1. Field of the Invention

The present invention relates to a confocal laser scanning microscope that enables acquisition of images of samples by use of various observation methods such as brightfield observation.

2. Description of the Background Art

A confocal laser scanning microscope irradiates a sample with a laser beam emitted from a laser beam source, and detects a measurement beam from the sample by use of a confocal aperture diaphragm. By performing this operation, the confocal laser scanning microscope acquires a shallow-focus confocal image of the sample. Known confocal laser scanning microscopes include a microscope which acquires both a shallow-focus confocal image and a deep-focus non-confocal image of a sample and selectively displays the confocal image and the non-confocal image.

Jpn. Pat. Appln. KOKAI Publication No. 9-133869, for example, discloses a confocal laser scanning microscope capable of selectively displaying a confocal image and a non-confocal image. A light beam from a sample passes through a confocal aperture and is detected by a first detector. The first detector detects the light beam coming from the sample by way of the confocal aperture, and outputs a confocal image signal. A light beam from the sample is received by a second detector. The second detector detects the light beam coming from the sample and outputs a non-confocal image signal. The confocal image signal output by the first detector and the non-confocal image signal output by the second detector are supplied to a switching device. The switching device electrically switches between the confocal image signal output by the first detector and the non-confocal image signal output by the second detector, and supplies the selected image signal to a monitor. The monitor displays either the confocal image or the non-confocal image.

The confocal laser scanning microscope of Jpn. Pat. Appln. KOKAI Publication No. 9-133869 allows selection between the confocal image and the non-confocal image of the sample. The non-confocal image can be acquired by subjecting the sample to reflected illumination and performing brightfield observation of the sample. In addition, although the sample can be observed by brightfield observation, there is a demand that the sample be observed by darkfield observation as well. There is also a demand that the surface of the sample be observed finely by use of the confocal laser scanning microscope.

BRIEF SUMMARY OF THE INVENTION

A confocal laser scanning microscope according to a major aspect of the present invention comprises: a laser beam source for outputting a laser beam; a laser optical system which irradiates a sample with the laser beam output by the laser beam source and which detects a measurement beam coming from the sample so as to acquire a confocal image of the sample; a light source which emits illumination light having an arbitrary wavelength; and an optical-microscope optical system which directs the illumination light emitted from the light source to the laser optical system to illuminate the sample and which measures illumination light coming from the sample, thereby obtaining a non-confocal image of the sample, the optical-microscope optical system including optical systems corresponding to at least two observation methods, one of which is selected during use.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment of the present invention will now be described, referring to the drawings.

Figure 1:
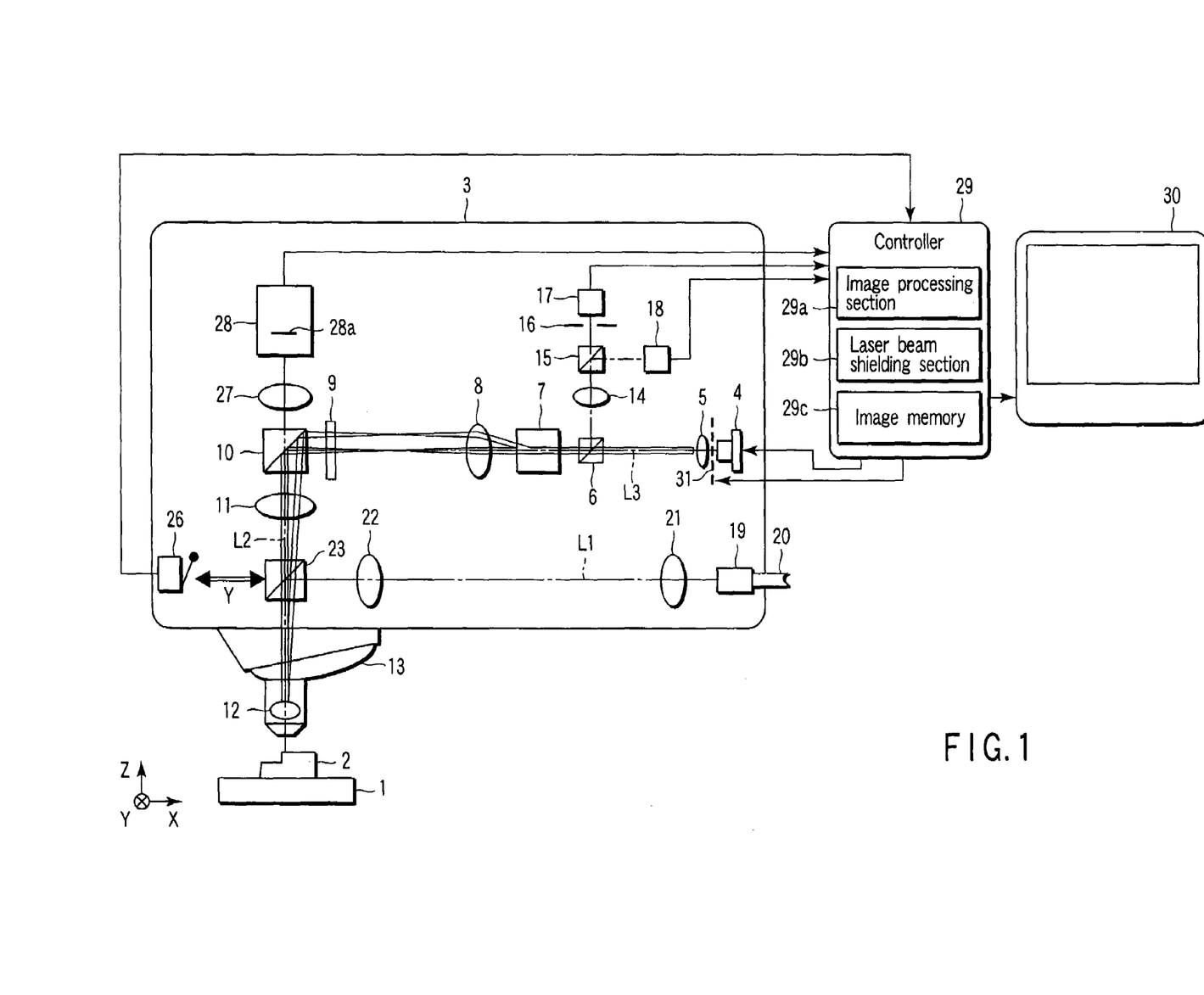
FIG. 1 is a configuration diagram showing a confocal laser scanning microscope according to the first embodiment of the present invention.

FIG. 1 is a configuration diagram showing a confocal laser scanning microscope. A sample 2 is placed on a sample table 1. A description will be given of the laser optical system of the confocal laser scanning microscope. The laser optical system is made up of a laser beam source 4, a lens 5, a polarization beam splitter 6, an optical scanner 7, a pupil projection lens 8, a quarter-wavelength retardation plate 9, a first beam splitter 10, a focusing lens 11, an objective lens 12, a beam splitter 15, a confocal pin hole 16, a first detector 17, and a second detector 18. The optical axis passing through the laser beam source 4, lens 5, polarization beam splitter 6, optical scanner 7, pupil projection lens 8, quarter-wavelength retardation plate and first beam splitter 10 will be referred to as third optical axis L3.

An observation optical system is made up of a white light source 19, lenses 21 and 22, the objective lens 12, the focusing lens 11, a field lens 27 and a CCD camera 28. The optical axis passing through the white light source 19, lens 21 and lens 22 will be referred to as first optical axis L1.

There are optical elements used in common to the laser optical system and the observation optical system. Those optical elements are specifically objective lens 12, focusing lens 11 and first beams splitter 10. The optical axis passing through objective lens 12, focusing lens 11, first beam splitter 10, field lens 27 and CCD camera 28 will be referred to as second optical axis L2.

A more specific description will be given. The laser beam source 4 is provided in the main body 3 of a laser microscope. The laser beam source 4 is a semiconductor laser, for example. Lens 5, optical scanner 7, pupil projection lens 8, quarter-wavelength retardation plate 9 and first beam splitter 10 (which are used for the confocal laser scanning microscope) are arranged on the optical axis of the laser beam.

The optical scanner 7 is made of a galvano-mirror, for example. The optical scanner 7 scans the laser beam from the laser beam source 4 over the sample 2 in two dimensions. In other words, the two-dimensional scan of the sample 2 is performed in an XY plane.

The first beam splitter 10 does not have polarizing characteristics.

The focusing lens 11 and objective lens 12 are arranged on the downward optical path in the reflection direction of the first beam splitter 10. A revolver 13 is revolvable in the lower region of the laser microscope main body 3. A plurality of objective lenses having different magnifications are attached to the revolver 13. One of the objective lenses that has a desired magnification is selected and moved to the position on the second optical axis L2 by revolving the revolver 13.

When the sample 2 is irradiated with a laser beam, the polarizing beam splitter 6 reflects a first measurement beam. The first measurement beam is a beam reflected by the sample 2 and traveling by way of the objective lens 12, focusing lens 11, beam splitter 10, quarter-wavelength retardation plate 9, pupil projection lens 8, and optical scanner 7.

Focusing lens 14 and beam splitter 15 are arranged on the reflection-direction optical path of the polarizing beam splitter 6. The beam splitter 15 does not have polarizing characteristics. The beam splitter 15 splits the first measurement beam focused by the focusing lens 14 into beams that travels in two directions, namely the transmission direction and the reflection direction.

A first detector 17 is arranged in the transmission-direction optical path of the beam splitter 15. The confocal pin hole 16 is located between the beam splitter 15 and the first detector 17. A second detector 18 is arranged in the reflection-direction optical path of the beam splitter 15. The first and second detectors 17 and 18 are made of photodiodes or photomultipliers.

The optical system of the optical microscope will be described. The white light source 19 is arranged inside the laser microscope main body 3. The white light source 19 is provided by inserting the end of an optical fiber 20 into the laser microscope main body 3. Alternatively, the white light source 19 may be provided by incorporating a light source (e.g., a lamp) in the laser microscope main body 3. On the optical path along which the illumination light emitted from the white light source 19 travels, a brightfield/darkfield switching cube 23 (which serves as an optical element switching section) is provided in such a manner that lenses 21 and 22 are located between the white light source 19 and the brightfield/darkfield switching cube 23.

Figure 2:
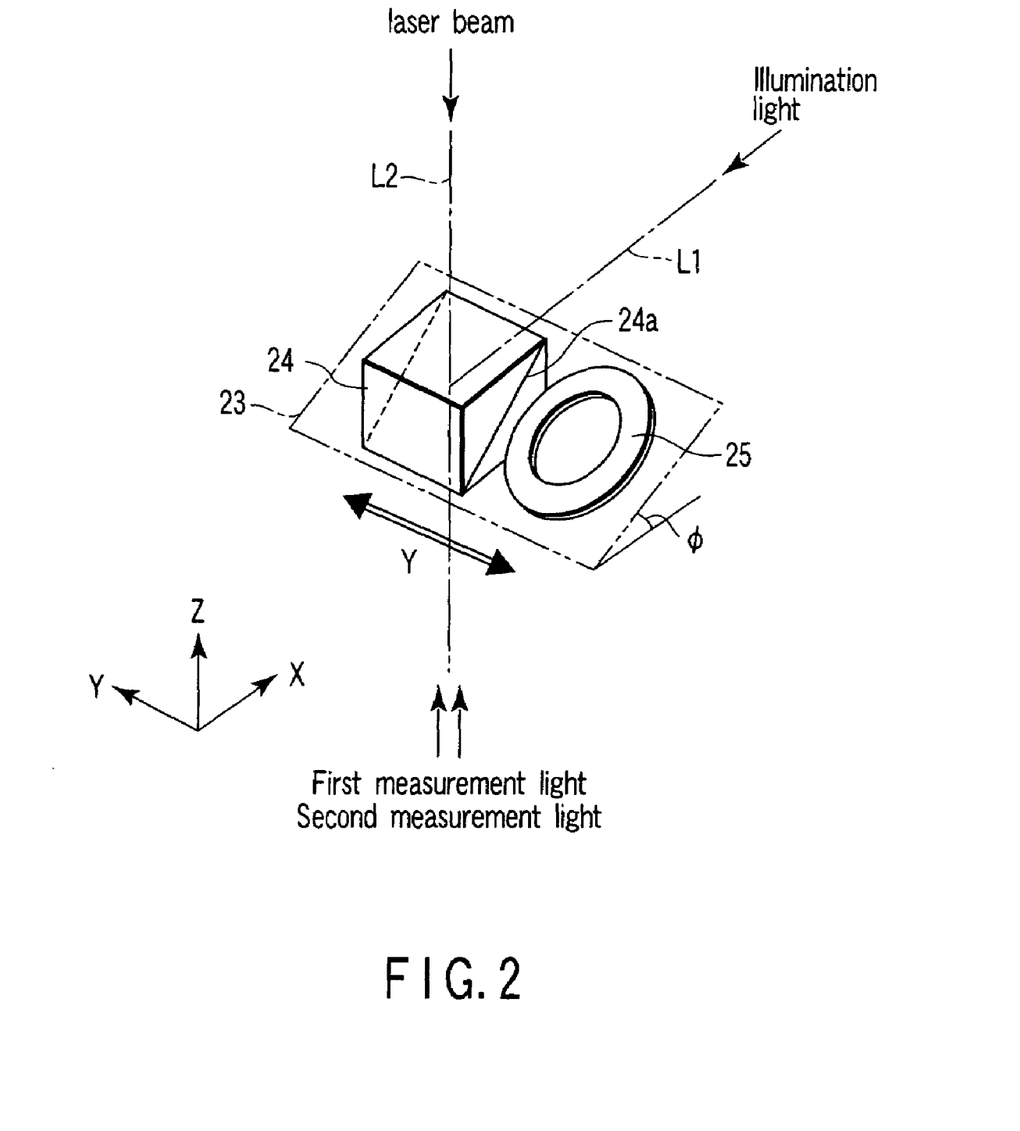
FIG. 2 is a configuration diagram showing a brightfield/darkfield switching cube employed in the microscope.

FIG. 2 is a structural view of the brightfield/darkfield switching cube 23. The brightfield/darkfield switching cube 23 comprises a brightfield prism (a brightfield half prism) 24 and a darkfield annular mirror (a darkfield doughnut mirror) 25. The brightfield prism 24 and darkfield annular mirror 25 of the brightfield/darkfield switching cube 23 are inserted and removed in the Y direction, which is perpendicular to both first and second optical axes L1 and L2. Either the brightfield prism 24 or the darkfield annular mirror 25 is arranged at the intersection between the first and second optical axes L1 and L2. The brightfield/darkfield switching cube 23 may be a manual type, in which case the brightfield prism 24 and the darkfield annular mirror 25 are manually switched from one to the other. Conversely, the brightfield/darkfield switching cube 23 may be an automatic type, in which case the brightfield prism 24 and the darkfield annular mirror 25 are automatically switched from one to the other by use of a motor or the like.

When the brightfield prism 24 is on the second optical axis L2, the pupil position of the optical system of the confocal laser scanning microscope coincides with the pupil position of the objective lens 12.

The brightfield prism 24 has a deflecting surface 24a. The deflecting surface 24a is at angle $\phi$ (=45°) to the X direction (i.e., the direction of the first optical axis L1). The brightfield prism 24 allows transmission of the laser beam emitted from the laser beam source 4, and also allows transmission of a first measurement beam reflected by the sample 2. The brightfield prism 24 reflects an illumination light emitted from the white light source 19 and causes it to travel downward. The brightfield prism 24 allows transmission of a second measurement beam which the sample 2 reflects then.

The darkfield annular mirror 25 is in the form of a ring. The darkfield annular mirror 25 is inclined at angle $\phi$ (=45°) relative to the X direction (i.e., the direction of the first optical axis L1). The darkfield annular mirror 25 shapes the illumination light emitted from the white light source 19 to have a ring shape and causes it to travel downward. The darkfield annular mirror 25 allows a second measurement beam, which the sample 2 reflects then, to travel through the opening of the annular mirror 25.

An optical path switching sensor 26, serving as a detecting section, is provided inside the laser microscope main body 3. The optical path switching sensor 26 detects which element of the brightfield/darkfield switching cube 23 (the brightfield prism 24 or the darkfield annular mirror 25) is arranged on the second optical axis L2, and outputs a switching signal. The optical path switching sensor 26 is made of a microswitch, for example.

The CCD camera 28 is arranged on the second optical axis L2 (i.e., the optical axis extending in the transmission direction of the first beams splitter 10), and the field lens 27 is located between the between the CCD camera 28 and the first beam splitter 10. The CCD camera 28 has an imaging plane 28a. An image of the sample 2 is focused on the imaging plane 28a, and the CCD camera 28 outputs an image signal representing the focused image.

A controller 29 includes an image processing section 29a, a laser beam shielding section 29b and an image memory 29c. When the laser beam emitted from the laser beam source 4 is scanned over the surface of the sample 2, the image processing section 29a performs image processing of an output signal of the first detector 17, thereby acquiring a confocal image of the sample 2. In addition, the image processing section 29a performs image processing of an output signal of the second detector 18, thereby acquiring a non-confocal image of the sample.

When the sample 2 is irradiated with the illumination light emitted from the white light source 19, the image processing section 29a performs image processing of an image signal output from the CCD camera 28, thereby acquiring a non-confocal image of the sample 2 in either the brightfield observation mode or the darkfield observation mode.

The image processing section 29*a* stores in the image memory 29*c*, data on the confocal image of the sample 2, confocal image data obtained in the brightfield observation mode and the darkfield observation mode, and the non-confocal image data. These confocal image data and the non-confocal image data are displayed on a monitor 30.

The laser beam shielding section 29*b* receives a switching signal output from the optical path switching sensor 26 and detects whether the darkfield annular mirror 25 is arranged on the second optical path L2. When the laser beam shielding section 29*b* detects that the darkfield annular mirror 25 has been arranged on the second optical axis L2, it stops the power supply from the laser-output power supply to the laser beam source 4. The power supply from the laser-output power supply to the laser beam source 4 is stopped by use of a relay circuit that does not use a semiconductor device. The relay circuit is, for example, a sequence circuit. By using such a circuit, the laser beam is prevented from undesirably entering the laser optical system.

The laser beam may be prevented from entering the laser optical system by adopting the following structure:

A shutter 31 is provided on the third optical axis L3 and located between the laser beam source 4 and lens 5, as shown in FIG. 1. The shutter 31 is closed when the power supply is stopped.

When the laser beam shielding section 29*b* detects that the darkfield annular mirror 25 has been arranged on the second optical axis L2, it stops the power supply to the shutter 31. In response to this, the shutter 31 closes, preventing a laser beam from entering the laser optical system.

A description will now be given as to how the microscope of the above structure operates.

When the laser optical system of the confocal laser scanning microscope is used, brightfield observation is performed as follows:

The brightfield prism 24 of the brightfield/darkfield switching cube 23 is arranged on optical path L1, as shown in FIG. 2. In this state, the laser beam emitted from the laser beam source 4 travels through lens 5 and the polarizing beam splitter 6 and is incident on the optical scanner 7.

The optical scanner 7 scans the incident laser beam over the sample 2 in the XY plane. The scanned laser beam is condensed by the pupil projection lens 8 and is then transmitted through the quarter-wavelength retardation plate 9. Where the laser beam emitted from the laser beam source 4 is P-polarization light, it is changed into circular polarization light due to the optical transmission through the quarter-wavelength retardation plate 9.

After being transmitted through the quarter-wavelength retardation plate 9, the laser beam is reflected by the first beam splitter 10 and guided downward. After passing through the focusing lens 11, the brightfield prism 24 and the objective lens 12, the laser beam is scanned over the sample 2.

The first measurement beam reflected by the sample 2 travels along the optical path that is opposite to the optical path along which the laser beam for illuminating the sample 2 travels. To be specific, the first measurement beam travels through the objective lens 12, brightfield prism 24, focusing lens 11, first beam splitter 10, quarter-wavelength retardation plate 9, pupil projection lens 8 and optical scanner 7, and is then incident on the polarizing beam splitter 6.

The first measurement beam changes into an S-polarization beam when it is being transmitted through the quarter-wavelength retardation plate 9. The polarization beam splitter 6 reflects the incident first measurement beam toward the focusing lens 14. The reflected first measurement beam travels through the focusing lens 14 and is then incident on the beam splitter 15. This beam splitter 15 splits the first measurement beam into two beams.

One of the two first measurement beams output from the beam splitter 15 travels through the confocal pin hole 16 and is incident on the first detector 17. As a result, a confocal image of the sample 2 is formed on the first detector 17. The first detector 17 outputs an image signal corresponding to the confocal image of the sample 2.

The other one of the two measurement beams output from the beam splitter 15 is incident on the second detector 18. As a result, a non-confocal image of the sample 2 is formed on the second detector 18. The second detector 18 outputs an image signal corresponding to the non-confocal image of the sample 2.

The image processing section 29*a* of the controller 29 receives the image signal output from the first detector 17. It also receives the image signal output from the second detector 18.

The image processing section 29*a* performs imaging processing of the output signal of the first detector 17, thereby acquiring a confocal image of the sample 2 obtained in the brightfield observation mode. In addition, the image processing section 29*a* performs imaging processing of the output signal of the second detector 18, thereby acquiring a non-confocal image of the sample 2 obtained in the brightfield observation mode.

The image processing section 29*a* stores both the confocal image data and the non-confocal image data in the image memory 29*c*. In addition, the image processing section 29*a* displays the confocal image data and the non-confocal image data on the monitor 30.

The darkfield observation is performed as follows:

When the sample 2 is subject to the brightfield observation using the laser optical system, the brightfield/darkfield switching cube 23 is switched in such a manner that the darkfield annular mirror 25 is arranged on the second optical axis L2 in place of the brightfield prism 24. The optical path switching sensor 26 detects that the darkfield annular mirror 25 has been arranged on the second optical axis L2, and outputs a switching signal.

By receiving the switching signal output from the optical path switching sensor 26, the laser beam shielding section 29*b* detects that the darkfield annular mirror 25 has been arranged on the second optical axis L2. In response to this detection, the laser beam shielding section 29*b* stops the power supply from the laser-output power supply to the laser beam source 4. The power supply from the laser-output power supply to the laser beam source 4 is stopped by use of a relay circuit that does not use a semiconductor device. The relay circuit is, for example, a sequence circuit. By using such a circuit, the laser beam is prevented from undesirably entering the laser optical system.

Where the shutter 31 is provided on the third optical axis L3 and located between the laser beam source 4 and the optical scanner 7, the laser beam shielding section 29*b* stops the power supply to the shutter 31 when it detects that the darkfield annular mirror 25 has been arranged on the second optical axis L2. As a result, the shutter 31 closes, preventing a laser beam from entering the laser optical system.

Hence, the sample 2 is not undesirably irradiated with the laser beam.

A description will now be given as to how the brightfield observation is performed using the optical system of the optical microscope.

The brightfield prism 24 of the brightfield/darkfield switching cube 23 is arranged on the second optical axis L2, as shown in FIG. 2. The laser beam source 4 stops outputting laser beams. Alternatively, the shutter 31 closes, as a result of which the laser beam emitted from the laser beam source 4 is shielded by the shutter 31.

The white light source 19 emits white illumination light. This illumination light travels through lenses 21 and 22 and is incident on the brightfield prism 24 shown in FIG. 2. The illumination light is reflected downward, and falls on the sample 2 after passing through the objective lens 12.

The second measurement beam reflected by the sample 2 travels through the objective lens 12, brightfield prism 24, focusing lens 11, first beam splitter 10 and field lens 27, and is then focused on the imaging plane 28a of the CCD camera 28. The CCD camera 28 outputs an image signal corresponding to the image of the sample 2 focused in the imaging plane 28a.

The image processing section 29a of the controller 29 receives an image signal output from the CCD camera 28. The image processing section 29a performs image processing of the image signal output from the CCD camera 28, thereby acquiring a non-confocal image of the sample 2 obtained in the brightfield observation mode. The image processing section 29a stores the acquired non-confocal image in the image memory 29c. In addition, the image processing section 29a displays the non-confocal image data on the monitor 30.

The darkfield observation using the optical system of the optical microscope is performed as follows:

The brightfield/darkfield switching cube 23 is operated in such a manner that the brightfield prism 24 is removed from the second optical axis L2 and the darkfield annular mirror 25 is arranged on the second optical axis L2. In the manner described above, the illumination light emitted from the white light source 19 travels through lenses 21 and 22 and is incident on the darkfield annular mirror 25.

The darkfield annular mirror 25 shapes the incident illumination light to have a ring shape and reflects it downward. The polarized, ring-shaped illumination light falls on the sample after passing through the objective lens 12. The objective lens 12 used in the darkfield observation is designed for darkfield use.

The second measurement beam reflected by the sample 2 travels through the objective lens 12, the aperture of the darkfield annular mirror 25, the focusing lens 11, the first beam splitter 10 and the field lens 27, and is then focused on the imaging plane 28a of the CCD camera 28. The CCD camera 28 outputs an image signal corresponding to the image of the sample 2 focused in the imaging plane 28a.

The image processing section 29a of the controller 29 receives an image signal output from the CCD camera 28. The image processing section 29a performs image processing of the image signal output from the CCD camera 28, thereby acquiring a non-confocal image of the sample 2 obtained in the darkfield observation mode. In a similar manner to that described above, the image processing section 29a stores the acquired non-confocal image in the image memory 29c, and displays it on the monitor 30.

In the first embodiment of the present invention, the brightfield/darkfield switching cube 23 is used to enable either the brightfield prism 24 (which is designed for use in an optical microscope) or the darkfield annular mirror 25 to be inserted in the optical axis L2 of the laser optical system of the confocal laser scanning microscope.

With this feature, both a confocal image and a non-confocal image of the sample 2 can be acquired using the laser optical system of the confocal laser scanning microscope. Furthermore, both brightfield observation and darkfield observation can be performed by use of the optical microscope. Therefore, a non-confocal image of the sample 2 can be acquired in both the brightfield observation mode and the darkfield observation mode.

When the darkfield annular mirror 25 is arranged on the second optical axis L2 during observation of the sample 2 using the laser optical system, the laser beam source 4 is turned off to stop output of laser beams. Alternatively, the laser beams output from the laser beam source 4 are shielded by the shutter 31. In this manner, the sample 2 is not exposed to an excessive amount of laser beam.

The quarter-wavelength retardation plate 9 is located between the first beam splitter 10 and the polarization beam splitter 6 and arranged on the third optical axis L3. The quarter-wavelength retardation plate 9 should be arranged as close as possible to the objective lens 12, but is not on the second optical axis L2. Arranged at such a position, the quarter-wavelength retardation plate 9 does not have adverse effects on the polarizing characteristics of the CCD camera system, including the objective lens 12, the brightfield prism 24, the focusing lens 11, the first beam splitter 10, the field lens 27 and the CCD camera 28.

A second embodiment of the present invention will now be described with reference to the drawings. In the descriptions below, the same reference numerals as used in FIG. 1 denote corresponding or similar structural elements, and a detailed description of such structural elements will be omitted.

Figure 3:
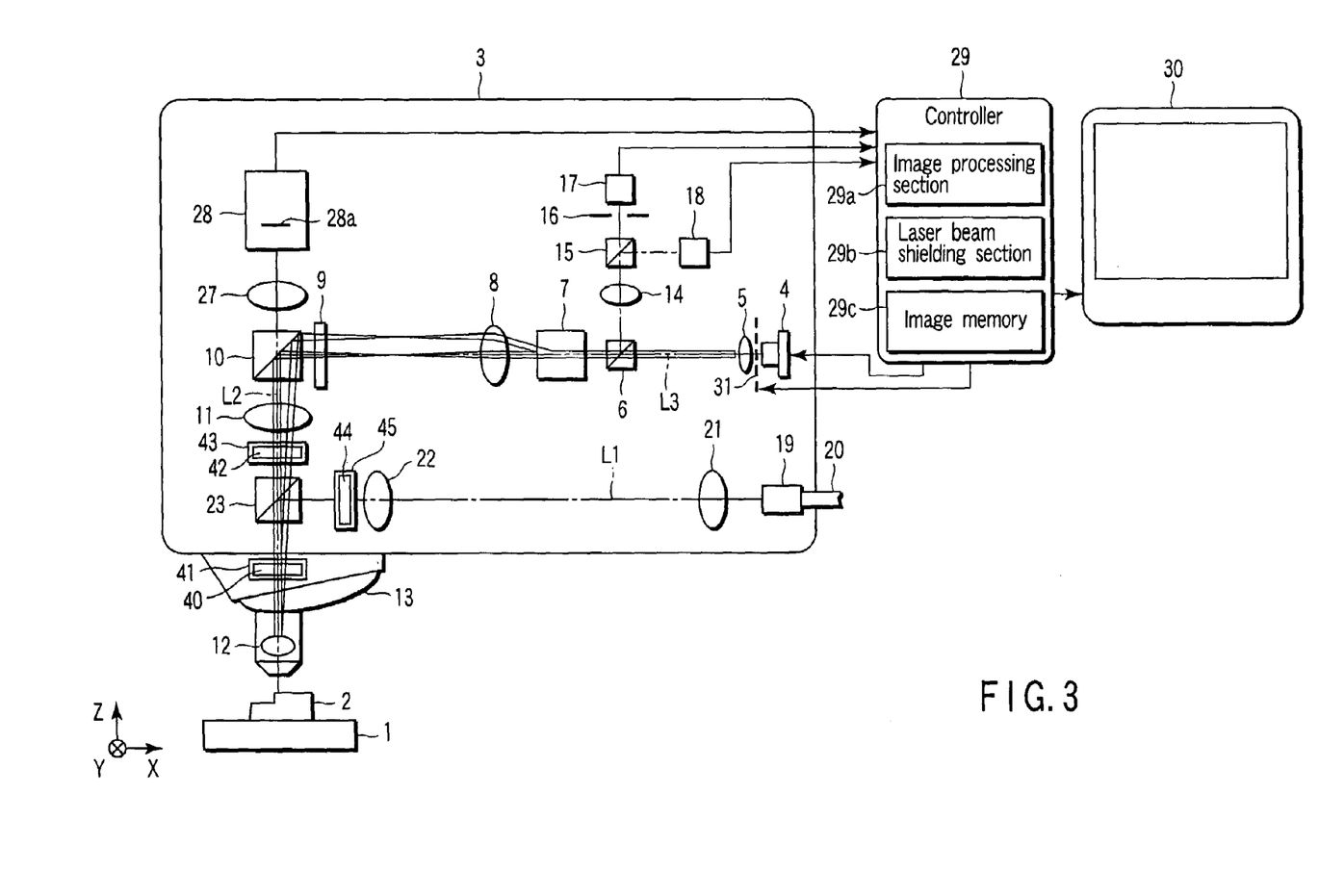
FIG. 3 is a configuration diagram showing a confocal laser scanning microscope according to the second embodiment of the present invention.

FIG. 3 is a structural view of a confocal laser scanning microscope. The main body 3 of the laser microscope is provided with an insertion hole 41 into which a differential interference contrast prism (hereinafter referred to as a "DIC prism") is inserted. The DIC prism insertion hole 41 is on the second optical axis L2 and located between the objective lens 12 and the brightfield/darkfield switching cube 23. To be more specific, the DIC prism insertion hole 41 is located between the objective lens 12 ands the brightfield prism 24. The DIC prism insertion hole 41 enables insertion or detachment of the DIC prism 40.

The DIC prism 40 is attached to a DIC prism slider, for example. The DIC prism slider is inserted into the DIC prism insertion hole 41 or pulled away from it. In this manner, the DIC prism 40 is arranged on the second optical axis L2.

The laser microscope main body 3 is provided with an analyzer insertion hole 43. The analyzer insertion hole 43 is arranged on the second optical axis L2 and located between the focusing lens 11 and the brightfield prism 24. An analyzer 42 is detachably inserted into the analyzer insertion hole 43.

To be more specific, the analyzer 42 is attached to an analyzer slider, for example. The analyzer slider is inserted into the analyzer insertion hole 43 or pulled away from it. In this manner, the analyzer 42 is arranged on the second optical axis L2.

The laser microscope main body 3 is provided with a polarizer insertion hole 45. The polarizer insertion hole 45 is arranged on the first optical axis L1 and located between lens 22 and the brightfield prism 24. A polarizer 44 is detachably inserted into the polarizer insertion hole 45.

To be more specific, the polarizer 44 is attached to a polarizer slider, for example. The polarizer slider is inserted into the polarizer insertion hole 45 or pulled away from it. In this manner, the polarizer 44 is arranged on the first optical axis L1.

The quarter-wavelength retardation plate 9 is located between the first beam splitter 10 and the polarization beam splitter 6 and arranged on the third optical axis L3. The quarter-wavelength retardation plate 9 should be arranged as close as possible to the objective lens 12, but is not on the second optical axis L2. Arranged at such a position, the quarter-wavelength retardation plate 9 does not have adverse effects on the polarizing characteristics of the CCD camera system, including the objective lens 12, the brightfield prism 24, the focusing lens 11, the first beam splitter 10, the field lens 27 and the CCD camera 28.

Neither the first beam splitter 10 nor the brightfield prism 24 has polarizing characteristics.

An operation of the microscope of the above structure will be described.

A description will now be given as to how the brightfield observation is performed using the laser optical system of the laser scanning microscope.

In the brightfield observation using the laser optical system, the DIC prism 40 is pulled out of the DIC prism insertion hole 41. The analyzer 42 is also pulled out of the analyzer insertion hole 43. The polarizer 44 may be held in the polarizer insertion hole 45; alternatively, it may be pulled out from it.

Where the DIC prism 40 and the analyzer 42 are removed from the positions on the second optical axis L2, and the polarizer 44 is removed from the position on the first optical axis L1, the laser optical system has the same configuration as the laser optical system of the first embodiment shown in FIG. 1. Therefore, the laser optical system acquires confocal and non-confocal images of the sample 2 in a similar way to that described in relation to the first embodiment, and a description of how the images are acquired will be omitted herein.

When the optical system of the optical microscope is used, brightfield observation and darkfield observation are performed as below.

In the brightfield observation and the darkfield observation using the optical system of the optical microscope, the DIC prism 40 is pulled out of the DIC prism insertion hole 41. The analyzer 42 is also pulled out of the analyzer insertion hole 43. Further, the polarizer 44 is pulled out from the polarizer insertion hole 45.

Where the DIC prism 40 and the analyzer 42 are removed from the positions on the second optical axis L2, and the polarizer 44 is removed from the position on the first optical axis L1, the optical system of the optical microscope has the same configuration as the optical system of the optical microscope of the first embodiment shown in FIG. 1. Therefore, the optical system of the optical microscope acquires a non-confocal image of the sample 2 in a similar way to that described in relation to the first embodiment, and a description of how the image is acquired will be omitted herein.

When the optical system of the optical microscope is used, brightfield differential interference observation is performed as below.

In the differential interference observation using the optical system of the optical microscope, the DIC prism 40 is inserted in the DIC prism insertion hole 41. The analyzer 42 is also inserted in the analyzer insertion hole 43. Likewise, the polarizer 44 is inserted in the polarizer insertion hole 45.

The brightfield/darkfield switching cube 23 is operated in such a manner that the brightfield prism 24 is arranged on the second optical axis L2.

The white illumination light emitted from the white light source 19 travels through lenses 21 and 22, the polarizer 44 and is incident on the brightfield prism 24. The illumination light is reflected downward by the brightfield prism 24, passes through the DIC prism 40 and the objective lens 12, and then falls on the sample 2.

The second measurement beam reflected by the sample 2 travels through the objective lens 12, the DIC prism 40, the brightfield prism 24, the analyzer 42, the focusing lens 11, the first beam splitter 10 and the field lens 27, and is then focused on the imaging plane 28a of the CCD camera 28. The CCD camera 28 outputs an image signal corresponding to the image of the sample 2 focused in the imaging plane 28a.

The image processing section 29a receives the image signal output from the CCD camera 28. The image processing section 29a performs imaging processing of the image signal output from the CCD camera 28, thereby acquiring a differential interference image of the sample 2 obtained in the brightfield observation mode. The image processing section 29a stores the acquired differential interference image in the image memory 29c, and displays it on the monitor 30.

When the optical system of the optical microscope is used, brightfield simplified polarization observation of the sample 2 is performed as below.

In the brightfield simplified polarization observation using the optical system of the optical microscope, the analyzer 42 is inserted in the analyzer insertion hole 43. Likewise, the polarizer 44 is inserted in the polarizer insertion hole 45. The DIC prism 40 is pulled out from the DIC prism insertion hole 41.

The brightfield/darkfield switching cube 23 is operated in such a manner that the brightfield prism 24 is arranged on the second optical axis L2.

The white illumination light emitted from the white light source 19 travels through lenses 21 and 22, the polarizer 44 and is incident on the brightfield prism 24. The illumination light is reflected downward by the brightfield prism 24, passes through the objective lens 12, and then falls on the sample 2.

The second measurement beam reflected by the sample 2 travels through the objective lens 12, the brightfield prism 24, the analyzer 42, the focusing lens 11, the first beam splitter 10 and the field lens 27, and is then focused on the imaging plane 28a of the CCD camera 28. The CCD camera 28 outputs an image signal corresponding to the image of the sample 2 focused in the imaging plane 28a.

The image processing section 29a receives the image signal output from the CCD camera 28. The image processing section 29a performs imaging processing of the image signal output from the CCD camera 28, thereby acquiring a simplified polarization image of the sample 2 obtained in the brightfield observation mode. The image processing section 29a stores the acquired simplified polarization image data in the image memory 29c, and displays it on the monitor 30.

When the laser optical system of the confocal laser scanning microscope is used, laser differential interference observation is performed as below.

In the laser differential interference observation, the DIC prism 40 is inserted in the DIC prism insertion hole 41. The analyzer 43 is pulled out from the analyzer insertion hole 43. The polarizer 44 may be pulled out from the polarizer insertion hole 45; alternatively, it may be held in the polarizer insertion hole 45.

The laser beam emitted from the laser beam source 4 travels through lens 5 and the polarizing beam splitter 6 and is incident on the optical scanner 7. The optical scanner 7 scans the incident laser beam over the sample 2 in the XY plane. The scanned laser beam is condensed by the pupil projection lens 8 and is then transmitted through the quarter-wavelength retardation plate 9. Where the laser beam emitted from the laser beam source 4 is P-polarization light, it is changed into circular polarization light due to the optical transmission through the quarter-wavelength retardation plate 9.

After being transmitted through the quarter-wavelength retardation plate 9, the laser beam is reflected by the first beam splitter 10 and guided downward. After passing through the focusing lens 11, the DIC prism 40, the brightfield prism 24 and the objective lens 12, the laser beam is scanned over the sample 2.

The first measurement beam reflected by the sample 2 travels along the optical path that is opposite to the optical path along which the laser beam for illuminating the sample 2 travels. To be specific, the first measurement beam travels through the objective lens 12, DIC prism 40, brightfield prism 24, focusing lens 11, first beam splitter 10, quarter-wavelength retardation plate 9, pupil projection lens 8 and optical scanner 7, and is then incident on the polarizing beam splitter 6.

The first measurement beam is transmitted through the quarter-wavelength retardation plate 9, and is then reflected by the polarizing beam splitter 6 and guided toward the focusing lens 14. The reflected first measurement beam travels through the focusing lens 14 and is then incident on the beam splitter 15. This beam splitter 15 splits the first measurement beam into two beams.

One of the two first measurement beams output from the beam splitter 15 travels through the confocal pin hole 16 and is incident on the first detector 17. As a result, a confocal differential interference image of the sample 2 is formed on the first detector 17. The first detector 17 outputs an image signal corresponding to the confocal differential interference image of the sample 2.

The other one of the two measurement beams output from the beam splitter 15 is incident on the second detector 18. As a result, a non-confocal differential interference image of the sample 2 is formed on the second detector 18. The second detector 18 outputs an image signal corresponding to the non-confocal differential interference image of the sample 2.

The image processing section 29a of the controller 29 receives the image signal output from the first detector 17. It also receives the image signal output from the second detector 18.

The image processing section 29a performs imaging processing of the output signal of the first detector 17, thereby acquiring a confocal differential interference image of the sample 2 obtained in the brightfield observation mode. In addition, the image processing section 29a performs imaging processing of the output signal of the second detector 18, thereby acquiring a non-confocal differential interference image of the sample 2 obtained in the brightfield observation mode.

The image processing section 29a stores both the confocal differential interference image data and the non-confocal differential interference image data in the image memory 29c. In addition, the image processing section 29a displays the confocal differential interference image data and the non-confocal differential interference image data on the monitor 30.

According to the second embodiment, the DIC prism 40 and the analyzer 42 can be detachably inserted in the optical axis L2 of the laser optical system of the confocal laser scanning microscope. In addition, the polarizer 44 can be detachably inserted in the optical axis L3 of the optical system of the optical microscope.

With this feature, both a confocal image and a non-confocal image of the sample 2 can be acquired using the laser optical system of the confocal laser scanning microscope.

Furthermore, images described below can be acquired using the optical system of the optical microscope. Specifically, a non-confocal image of the sample 2 can be acquired in the brightfield observation mode, a non-confocal image of the sample 2 can be acquired in the darkfield observation mode, and a differential interference image of the sample 2 can be acquired in the brightfield observation mode.

Where the analyzer 42 and the polarizer 44 are inserted, and the DIC prism 40 is detached, a simplified polarization image of the sample 2 can be acquired. The simplified polarization image can be acquired in the brightfield mode.

Since the DIC prism 40 is inserted, and both the analyzer 42 and the polarizer 44 are detached, both a confocal differential interference image and a non-focal differential interference image of the sample 2 can be acquired in the brightfield observation mode, using the laser optical system. Compared to the ordinary confocal and non-confocal images, the confocal differential interference image and the non-confocal differential interference image are advantageous when minute rough shapes are observed.

The quarter-wavelength retardation plate 9 of the confocal laser scanning microscope is as close as possible to the objective lens 12, but is located at a position that is not in the optical system of the CCD camera imaging system. Arranged at such a position, the quarter-wavelength retardation plate 9 provides high efficiency and does not have adverse effects on the polarizing characteristics of the CCD camera imaging system.

A third embodiment of the present invention will now be described with reference to the drawings. In the descriptions below, the same reference numerals as used in FIG. 3 denote corresponding or similar structural elements, and a detailed description of such structural elements will be omitted.

Figure 4:
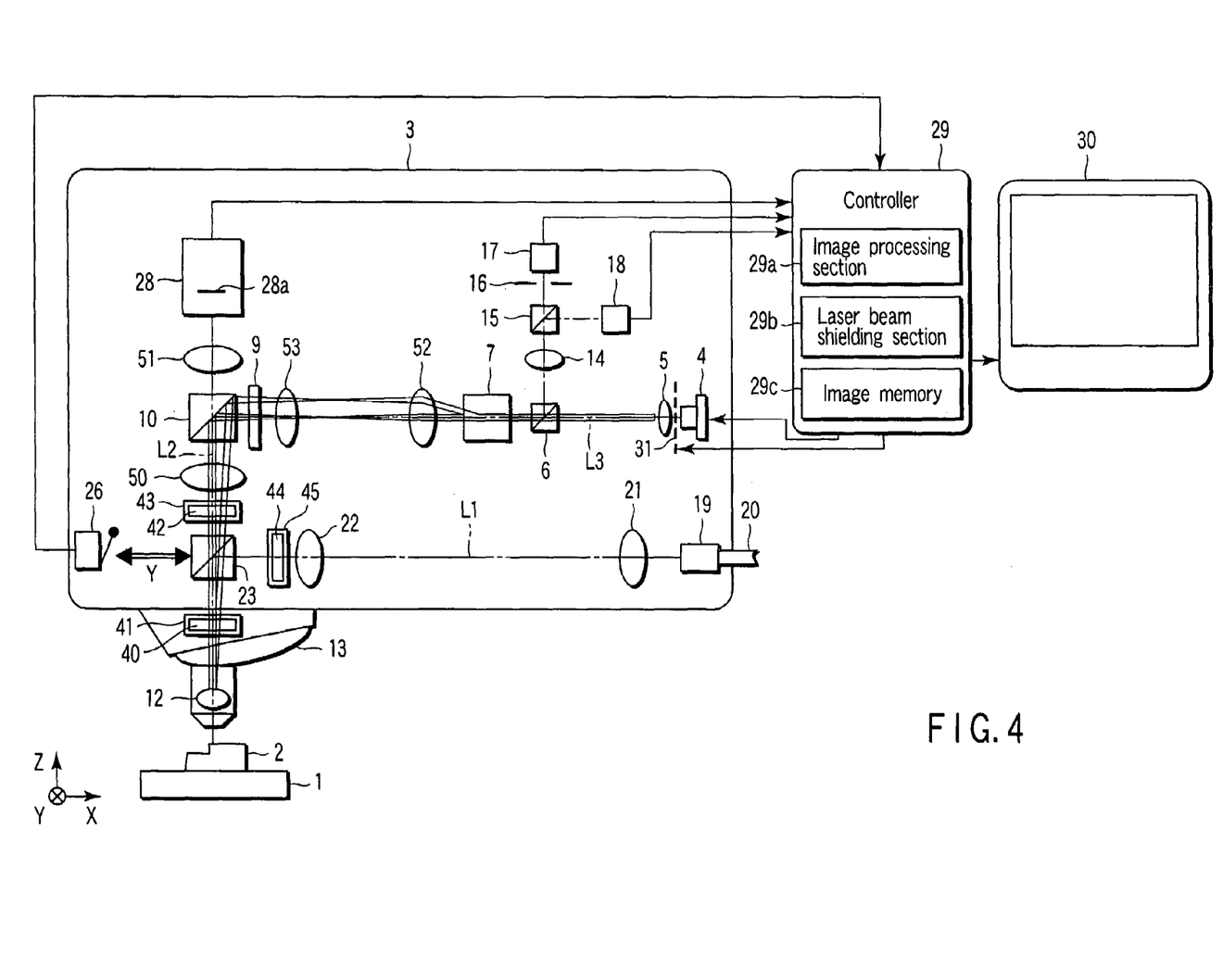
FIG. 4 is a configuration diagram showing a confocal laser scanning microscope according to the third embodiment of the present invention.

FIG. 4 is a structural view of a confocal laser scanning microscope. A focusing lens 50 is arranged on the second optical axis L2. The focusing lens 50 is at a position which is on the second optical axis L2 and which is located between the first beam splitter 10 and an analyzer insertion hole 43.

A first field lens 51 is provided on the second optical axis L2. The first field lens 51 is at a position which is on the second optical axis L2 and which is located between a first beam splitter 10 and a CCD camera 28.

The first field lens 51 serves to shorten the back focal distance, where the focusing lens 50 is combined. The first field lens 51 is made of a lens assembly including a plurality of optical lenses.

A pupil projection lens 52 and a second field lens 53 are arranged on the third optical axis L3 and are located between an optical scanner 7 and a quarter-wavelength retardation plate 9. The second field lens 53 serves to shorten the back focal distance, where the focusing lens 50 and the pupil projection lens 52 are combined. The second field lens 53 is made of a lens combination including a plurality of optical lenses.

The field of vision of the non-confocal image formed on the imaging plane 28a of the CCD camera 28 when the first field lens 51 and the focusing lens 50 is combined and the field of vision of the confocal image formed on the first detector 17 when the second field lens 53, the focusing lens 50 and the pupil projection lens 52 are combined, are the same in size.

The third embodiment uses the first field lens 51 described above, and the use of this lens 51 is advantageous in that the back focal distance obtained when the first lens 51 and the focusing lens 50 are combined is short. The third embodiment also uses the second field lens 53, and the use of this lens 53 is advantageous in that the back focal distance obtained when the second field lens 53, the focusing lens 50 and the pupil projection lens 52 are combined is short.

Accordingly, the laser optical system and the CCD camera imaging system of the confocal laser scanning microscope have short optical paths, and the laser microscope main body 3 can be as small as possible.

If the first field lens 51 and the second field lens 53 are merely arranged on the second and third optical axes, respectively, the first field of vision of the non-confocal image formed on the imaging plane 28a of the CCD camera 28 may differ in size from the second field of vision of the confocal image formed on the first detector 17. Therefore, the first field lens 51 and the focusing lens 50 are combined in such a manner that their focal distances enable the first and second fields of vision to be the same in size. Likewise, the second field lens 53, the focusing lens 50 and the pupil projection lens 52 are combined together in such a manner that their focal distances enable the first and second fields of vision to be the same in size.

A description will now be given as to how the microscope of the above structure operates.

When brightfield observation is performed using the laser optical system of the confocal laser scanning microscope, the DIC prism 40, the analyzer 42 and the polarizer 44 are pulled out from the DIC insertion hole 41, the analyzer insertion hole 43 and the polarizer insertion hole 45, respectively.

In the state where the DIC prism 40 and the analyzer 42 are away from the second optical axis L2, and the polarizer 44 is away from the first optical axis L1, the laser optical system has the same configuration as the laser optical system of the first embodiment. Therefore, the laser optical system acquires confocal and non-confocal images of the sample 2 in a similar way to that described in relation to the first embodiment, and a description of how the images are acquired will be omitted herein.

When brightfield observation and darkfield observation are performed using the optical system of the optical microscope, the DIC prism 40, the analyzer 42 and the polarizer 44 are pulled out from the DIC insertion hole 41, the analyzer insertion hole 43 and the polarizer insertion hole 45, respectively.

In the state where the DIC prism 40 and the analyzer 42 are pulled out as above, the optical system of the optical microscope has the same configuration as the optical system of the optical microscope of the first embodiment shown in FIG. 1. Therefore, the optical system of the optical microscope acquires confocal and non-confocal images of the sample 2 in a similar way to that described in relation to the first embodiment, and a description of how the images are acquired will be omitted herein.

When differential interference observation is performed using the optical system of the optical microscope, the DIC prism 40, the analyzer 42 and the polarizer 44 are inserted into the DIC insertion hole 41, the analyzer insertion hole 43 and the polarizer insertion hole 45, respectively.

In the state where the DIC prism 40, the analyzer 42 and the polarizer 44 are inserted as above, the optical system of the optical microscope has the same configuration as the optical system of the optical microscope of the second embodiment shown in FIG. 2. Therefore, the optical system of the optical microscope acquires differential interference images of the sample 2 in a similar way to that described in relation to the second embodiment, and a description of how the images are acquired will be omitted herein.

When simplified polarization observation of the sample 2 is performed using the optical system of the optical microscope, the analyzer 42 and the polarizer 44 are inserted into the analyzer insertion hole 43 and the polarizer insertion hole 45, respectively. The DIC prism 40 is pulled out from the DIC prism insertion hole 41.

In the state where the analyzer 42 and the polarizer 44 are inserted and the DIC prism 40 is pulled out as above, the optical system of the optical microscope has the same configuration as the optical system of the optical microscope of the second embodiment shown in FIG. 2. Therefore, the optical system of the optical microscope acquires simplified polarization images of the sample 2 in a similar way to that described in relation to the second embodiment, and a description of how the images are acquired will be omitted herein.

When laser differential interference observation is performed, the DIC prism 40 is inserted and the analyzer 42 and the polarizer 44 are pulled out. In the state where the DIC prism 40 is inserted and the analyzer 42 and the polarizer 44 are pulled out, the laser optical system has the same configuration as that of the laser optical system of the second embodiment shown in FIG. 2. Therefore, the laser optical system acquires confocal and non-confocal differential interference images of the sample 2 in a similar way to that described in relation to the second embodiment, and a description of how the images are acquired will be omitted herein.

When the darkfield annular mirror 25 is arranged on the second optical axis L2 during observation of the sample 2 using the laser optical system of the confocal laser scanning microscope, the laser beam source 4 is turned off to stop output of laser beams. Alternatively, the laser beams output from the laser beam source 4 are shielded by the shutter 31. In this manner, the sample 2 is not exposed to an excessive amount of laser beam.

In the first and second embodiments described above, the third optical axis L3 is bent by use of the first beam splitter 10 in such a manner that the bent portion of the third optical axis L3 coincides with the second optical axis L3. However, the third optical axis L3 need not be bent; it may be linear. Where the third optical axis L3 is linear, the optical axis along which the field lens 27 and the CCD camera 28 are arranged may be bent so that the bent portion of that optical axis coincides with the third optical axis L3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A confocal laser scanning microscope comprising:
   a laser beam source for outputting a laser beam;
   a laser optical system which irradiates a sample with the laser beam output by the laser beam source and which detects a measurement beam coming from the sample so as to acquire a confocal image of the sample;
   a light source which emits illumination light having an arbitrary wavelength;

an optical element switching section including: a brightfield prism which enables the illumination light emitted from the light source to be guided to the laser optical system; and a darkfield annular mirror which shapes the illumination light emitted from the light source to have a ring shape to the laser optically system, the optical element switching section selectively arranging in the brightfield prism and the darkfield annular mirror at a position where the illumination light emitted from the light source is guided to the laser optical system;

an optical-microscope optical system which directs the illumination light emitted from the light through the brightfield prism or the darkfield annular mirror to the laser optical system to illuminate the sample and which measures illumination light coming from the sample, thereby obtaining a non-confocal image of the sample, the optical-microscope optical system including optical systems corresponding to at least two observation methods, one of which is selected during use.

2. The confocal laser scanning microscope according to claim 1, wherein the optical systems of the optical-microscope optical system enable brightfield observation, darkfield observation and differential interference observation, respectively, and the optical-microscope optical system is switched to one of the optical systems.

3. The confocal laser scanning microscope according to claim 1, further comprising:

a detecting section which detects either the brightfield prism or the darkfield annular mirror detachably arranged at the position where the illumination light emitted from the light source is guided to the laser optical system; and a laser light modulating/shielding section which prevents the laser beam from entering the laser optical system when the detecting section detects that the darkfield annular mirror has been arranged at the position.

4. The confocal laser scanning microscope according to claim 3, wherein the laser light modulating/shielding section stops outputting the laser beam from the laser beam source.

5. The confocal laser scanning microscope according to claim 3, wherein the laser light modulating/shielding section includes a light shielding mechanism for shielding the laser beam output from the laser beam source.

6. The confocal laser scanning microscope according to claim 3, wherein the laser light modulating/shielding section includes a light modulating section for modulating the laser beam output from the laser beam source.

7. The confocal laser scanning microscope according to claim 1, wherein the illumination light emitted from the light source includes white light.

8. The confocal laser scanning microscope according to claim 1, further comprising:

a beam splitter located at a branch point from which the laser optical system and the optical-microscope optical system branch, and dividing the laser optical system and the optical-microscope optical system from each other;

a polarizing beam splitter arranged on an optical axis of the laser beam emitted from the laser beam source; and a quarter-wavelength retardation plate which shifts the wavelength of the laser beam from the laser beam source by one quarter-wavelength, and which shifts the wavelength of the measurement beam coming from the sample by one quarter-wavelength, the quarter-wavelength retardation plate being arranged on an optical axis between the beam splitter and the polarizing beam splitter.

9. The confocal laser scanning microscope according to claim 8, wherein the beam splitter does not have polarizing characteristics.

10. The confocal laser scanning microscope according to claim 8, wherein the quarter-wavelength retardation plate is arranged on the optical axis between the beam splitter and the polarizing beam splitter and located as close as possible to the beam splitter.

11. A confocal laser scanning microscope according to claim 1, further comprising a CCD camera arranged on the optical-microscope optical system which acquires the confocal image.

* * * * *